S. STROH.
SEAL FOR PACKING CASES.
APPLICATION FILED MAY 16, 1910.

1,018,943.

Patented Feb. 27, 1912.

WITNESSES:
Geo. Bambay.
J. P. Davis

INVENTOR
Sigmund Stroh
BY
ATTORNEYS

UNITED STATES PATENT OFFICE.

SIGMUND STROH, OF LONDON, ENGLAND.

SEAL FOR PACKING-CASES.

1,018,943.     Specification of Letters Patent.     Patented Feb. 27, 1912.

Application filed May 16, 1910. Serial No. 561,582.

*To all whom it may concern:*

Be it known that I, SIGMUND STROH, a subject of the King of Hungary, and resident of 30 Allerton Road, Lordship Park, London, N., England, merchant, have invented certain new and useful Improvements in Seals for Packing-Cases, of which the following is a specification.

This invention relates to seals for packing cases, and has for its object to provide a seal for connecting a lid to a box of such form that the lid or box cannot be cut away along the edges of the seal to open the box without defacing the seal or leaving evidence of the seal having been tampered with.

Packing cases have hitherto been secured closed by clamps in the form of a U-shaped piece of metal which is driven into the lid and side of the packing case and secured in place by a pin driven through the case and through the two arms of the U-shaped piece of metal. Sealing wax has also been used for securing packing cases, but owing to the brittle nature of the wax, the seals are very frequently broken or entirely removed when the cases are handled.

The usual form of clamp is as above set forth, a U-shaped piece of metal. Such clamps have been plain on the outer surface and possess the disadvantage that any unauthorized person can either remove the clamp and replace it with a similar one, or cut through the wood around the edges of the clamp and so separate the lid and the case. For greater security the clamps constructed in accordance with this invention are embossed in any suitable manner so as to form seals and moreover they are cut in a shape which is mainly circular with arms projecting therefrom.

Other advantages of the seals will be more fully set out in the following description and claims.

Reference is to be had to the accompanying drawings wherein—

Figure 1:
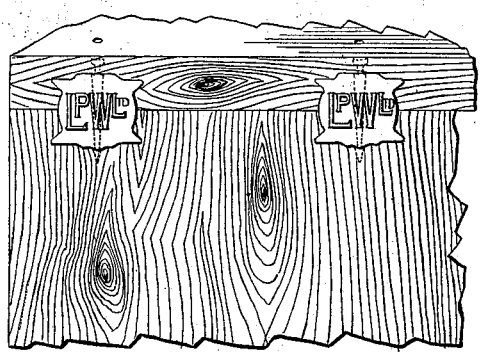
Figure 3:
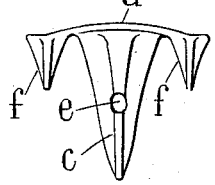
Figure 2:
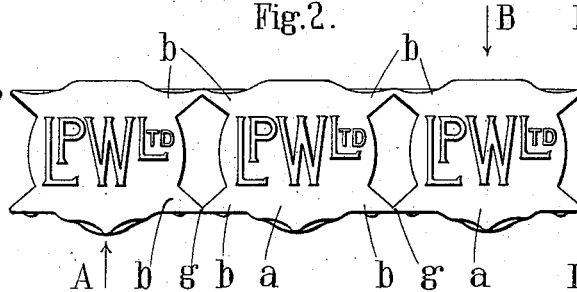
Figure 4:
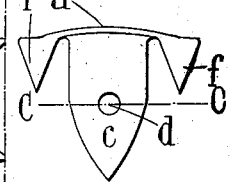
Figure 5:
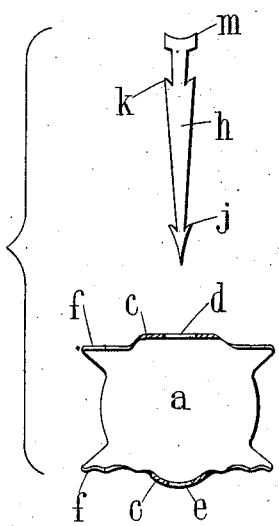

Figure 1 illustrates a portion of a packing case showing seals fixed in position. Fig. 2 is a face view of three of the seals of a strip. Fig. 3 is a view in the direction of the arrow A, Fig. 2, and Fig. 4 is a similar view in the direction of the arrow B, Fig. 2, and Fig. 5 is a cross section on the line C—C Fig. 4, showing the pin which is adapted to be driven through the seal.

As will be seen in the drawings, each seal comprises a body portion $a$ which is approximately circular with projections $b$. Extending at right angles to the body portion $a$ are a pair of pointed arms $c$ provided with openings $d$ $e$ and on each side of the arms $c$ and disposed in planes parallel thereto, are shorter pointed arms $f$ forming continuations of and at right angles to the projections $b$. The strip of seals shown in Fig. 2 is made from a single piece of metal, the individual seals being connected together by narrow necks of metal $g$ between the projections $b$ of adjacent seals.

In use the seals are adapted to be automatically severed from the strip and driven into the packing case so that the arms $c$ and $f$ on one side enter the lid of the case and the arms $c$ and $f$ on the other side enter the side of the case as clearly shown in Fig. 1. A barbed pin $h$ is then forced through the lid of the packing case so as to pass through the holes $d$ and $e$ in the arms $c$. The pin $h$ is made with a barb $j$ near one end which is smaller than the hole $d$ but larger than the hole $e$; the pin $h$ also has another barb $k$ near the other end which is larger than the hole $d$; consequently when the pin is forced through the holes $d$ and $e$ the barbs $j$ and $k$ will engage the arms $c$. The pin $h$ is also made with a head having pointed corners $m$ which engage the wood of the packing case lid when the head of the pin is driven below the surface thereof.

It frequently happens that the grain of the wood runs longitudinally of the lid of the packing case, while it runs transversely in the side as is clearly shown in Fig. 1 of the drawings. The result of this is that with metal sealing clamps as hitherto made when an attempt is made to drive in one arm of the clamp across the grain, the arm collapses and crumples up. To overcome this objection the seals made in accordance with this invention are provided at one side with arms which are curved in cross section, as will be clearly seen in Fig. 5, thereby greatly increasing their strength against crushing. If desired all the arms may be so curved. It will also be seen from Fig. 1, that if a cut is made through the side of the case around the edge of the seal it will be impossible to lift away the seal with the lid because a dovetail is formed.

It is to be understood that the line D—D in Fig. 2 indicates that a strip of seals has been broken and that the number of seals in a strip is not limited to three; obviously any number of seals may be made in a single strip according to the length of the metal.

Claims.

1. A seal comprising a body part of approximately circular form, a plurality of pairs of individual projections from and approximately in the plane of said body part and pointed arms extending at right angles to said body part and having holes therein, the width of the seal across said projections being greater than the width across that part of the seal intermediate of said pairs of projections.

2. A seal comprising a body part of approximately circular form, a plurality of pairs of individual projections from said body part and approximately in the same plane therewith, pointed arms extending at right angles to said body part and having holes therein and pointed arms extending at right angles to said projections, the width of the seal across said projections being greater than the width across that part of the seal intermediate of said pairs of projections.

3. A seal comprising an embossed body part of approximately circular form, a plurality of pairs of individual projections from said body part and approximately in the same plane therewith, pointed arms extending at right angles to said body part and oppositely disposed on each side thereof, and having holes therein, pointed arms extending at right angles to said projections and disposed in planes parallel to said first-named pointed arms, the arms on one side of said body part being curved in cross section, and a pin adapted to be driven through the said holes and having barbs adapted to engage said arms, the width of the seal across said projections being greater than the width across that part of the seal intermediate of said pairs of projections, substantially as set forth.

4. A seal comprising an embossed body part of approximately circular form, a plurality of pairs of individual projections from said body part extending in approximately the same plane with the body part, pointed arms extending at right angles to said body part and oppositely disposed on each side thereof, and having holes therein, pointed arms extending at right angles to said projections and disposed in planes parallel to said first-named pointed arms, said arms being curved in cross section, and the width of the seal across said projections being greater than the width across that part of the seal intermediate of said projections.

SIGMUND STROH.

Witnesses:
P. LINNEWICL,
A. ROSENBERG.

---

Copies of this patent may be obtained for five cents each, by addressing the "Commissioner of Patents, Washington, D. C."